UNITED STATES PATENT OFFICE.

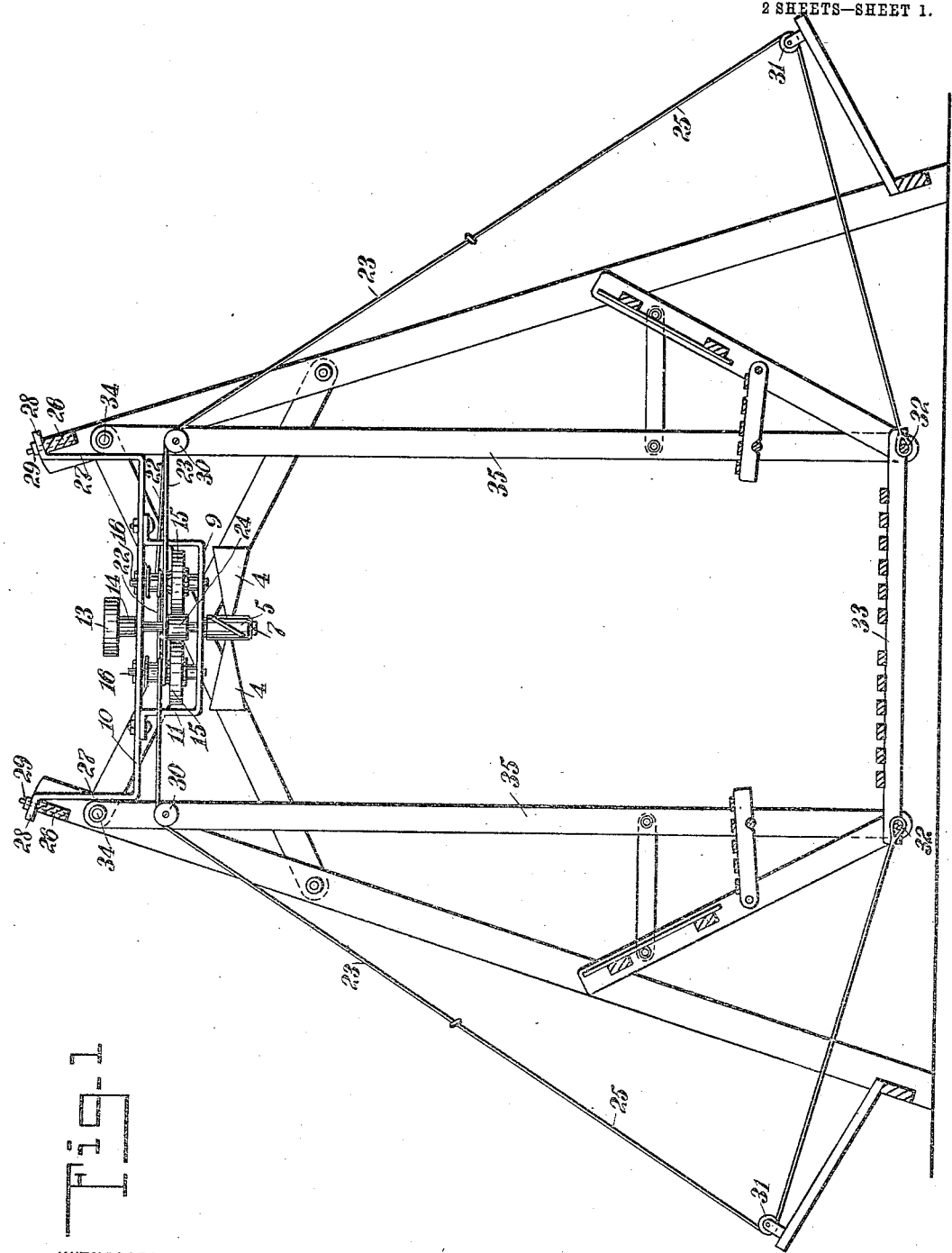

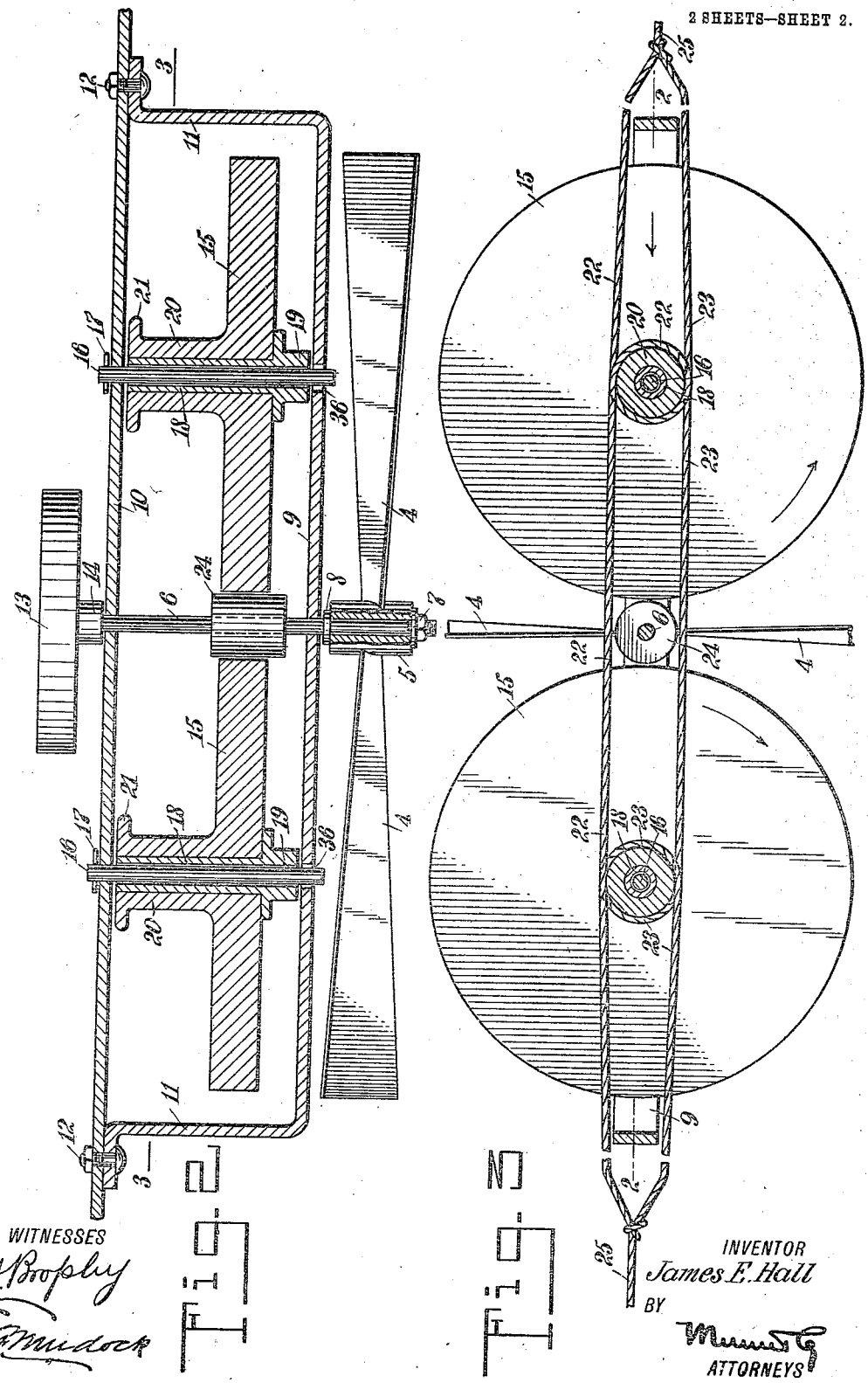

JAMES ELY HALL, OF GREENVILLE, ILLINOIS.

LAWN-SWING FAN.

962,341.  Specification of Letters Patent.  Patented June 21, 1910.

Application filed September 11, 1909. Serial No. 517,186.

*To all whom it may concern:*

Be it known that I, JAMES ELY HALL, a citizen of the United States, and a resident of Greenville, in the county of Bond and State of Illinois, have invented a new and Improved Lawn-Swing Fan, of which the following is a full, clear, and exact description.

Among the principal objects which the present invention has in view are: to provide a fan and operating mechanism therefor to be operated by the swaying of the swing; and to provide a fan and operating mechanism therefor adapted to be quickly and readily attached to and detached from the swing frames of ordinary construction.

One embodiment of the present invention is disclosed in the structure illustrated in the accompanying drawings, in which like characters of reference denote corresponding parts in all the views, and in which—

Figure 1 is a longitudinal vertical section of a swing of usual construction, having applied thereto a fan and operating mechanism therefor constructed and arranged in accordance with the present invention; Fig. 2 is a vertical longitudinal section of the fan and operating mechanism, the section being taken on the line 2—2 in Fig. 3; Fig. 3 is a horizontal section taken on the line 3—3 in Fig. 2. In this view fragments of the fan blades only are shown, and the driving cable is added to the illustration.

The fan blades 4, 4 are extended from a hub 5. The hub 5 is fixedly secured on a shaft 6 by means of a jam nut 7, and a collar 8 fixedly secured on the shaft 6. The shaft 6 is supported in suitable bearings formed in a hanging bar 9 and an upper bar 10. The two bars 9 and 10 are separated but a short and suitable distance by vertical extensions 11, 11 of the hanging bar 9. Outturned portions of the extensions 11, 11 are perforated to receive bolts 12, 12, as shown particularly in Fig. 2 of the drawings. The hanging bar 9 and the upper bar 10 are formed from strap or bar metal of as light weight as is commensurate with the work to be performed.

At the upper end of the shaft 6 there is fixedly secured a fly wheel 13. The shaft carrying the fan blades and fly wheel is supported by a collar 14, which is fixedly secured to the shaft 6. When desired, this collar 14 may be substituted by an extension of the hub of the wheel 13.

The shaft 6 and elements connected therewith are rotated by friction disks 15, 15. The disks 15, 15 are mounted fixedly on shafts 16, 16, which are extended through perforations in the upper and hanging bars 10 and 9, suitable bearings being formed therein for the said shafts. A simple device for maintaining the shafts in position is a cotter pin 17, which is extended through perforations provided in each of the said shafts.

The openings 36, 36 in the hanging bar 9 through which the ends of the shafts 16, 16 protrude, are enlarged or elongated to permit the said shafts to rock in their bearings to relieve the strain of the friction disks 15, 15 mounted on the said shafts, against the friction pulley mounted on the shaft 6. The cables by means of which the disks are operated exert a pull upon the said disks which seats the edge thereof against the friction pulley, as hereinafter described.

The disks 15, 15 are provided with suitable hub bushings 18, 18, the lower extensions 19, 19 whereof are adapted to rest upon the hanging bar 9 to maintain the said disks in alinement. The said disks are further provided with extended spool hubs 20, 20. The hubs 20, 20 are provided at the upper edge with flanges 21, 21. It is upon the hubs 20, 20 that the driving cables 22 and 23 are wound.

The shaft 6 receives the rotary motion imparted from the disks 15, 15 through a friction pulley 24. The pulley 24 is disposed with reference to the disks 15, 15 to have frictional engagement with both of the same. The cables 22 and 23 are approximately the same length and are joined to main driving cables 25, 25. Each of the said cables is reeved upon one of the hubs 20 at least one complete turn, but more may be used if desired. The reeving on the two opposite hubs is oppositely disposed or arranged to rotate the said hubs and disks 15, 15 connected therewith in opposite directions, which is illustrated most clearly in Fig. 3 of the drawings, where the cable 23 is reeved about the hub 20 at the left of the center of the illustration, while the cable 22 is reeved upon the hub 20 at the right of the illustration. By means of this reeving, when the joined cables 22 and 23 are moved in the direction shown by the arrow in said Fig. 3, the disks 15, 15 have imparted to them the rotary directions also indicated by the arrows in the said figure.

The fan and operating mechanism therefor may be manufactured and handled as a single machine, comprising the parts heretofore described assembled in position to be attached to the cross braces 26, 26 of the usual lawn swing. It is for this purpose that the upper bar 10 is provided with vertical extensions 27, 27, which are provided with overturned ends 28, 28 adapted to extend over the braces 26, 26. By reason of the elongation of the extensions 27, 27, these may be expanded or contracted to accommodate various swing structures.

When the fan and operating mechanism above described are secured in position upon the braces 26, 26, and there held by bolts 29, 29, the cables 22, 23 are passed over idlers 30, 30. The cables 25, 25 at each end of the joined cables 22 and 23 are extended under idlers 31, 31 and anchored at 32, 32 upon the structure of the swing seat. In this position the fan and operating mechanism are in condition to be operated. As the body 33 swings about the pivots 34, 34 upon the arms 35, 35, a pulling strain is exerted on the one or the other of the cables 25, 25. This results in drawing the doubled cable 22, 23 alternately in opposite directions. The alternate pulls on the said cables result in rotating the disks 15, 15 in alternate opposite rotary directions. By reason of the enlarged openings 36, 36 for the shafts 16, 16, the disks 15 on opposite sides of the pulley 24 are drawn into frictional contact with the said pulley alternately. The result of the alternate contacts of the disks 15 on opposite sides of the center, with the pulley 24, is to maintain the constant rotary action of the shaft 6, the fan plates 4, 4 and the fly wheel 13. During the interval of shifting from the one disk to the other, when the frictional contact of the disks on the pulley 24 is relieved, the wheel 13 carries over and maintains the rotation of the shaft 6. By reason of this construction, the swing body 33 does not feel the drag of the fan operating mechanism at the top of the oscillation where the retarding strain of the fan mechanism would have its greatest effect. It does not begin to feel the drag of the operating mechanism until it has started downward and at considerable impetus. This is for the reason that during the first part of the oscillation, neither of the disks is brought into operative contact with the pulley 24. This arrangement is also of great advantage at the beginning of the operation of swinging. At this point the engagement of the disks 15, 15 with the pulley 24 is light and does not form a drag upon the swing.

In the operation of the device, as the body 33 swings from side to side, it draws upon the cables 25 on opposite sides of the center of the swing, alternately extending the cables 22 and 23 in first one and then the opposite direction. The result of this action of the cables is as above described, to alternately engage the disks 15, 15 on opposite sides of the pulley 24, causing a continuous rotation of the shaft 6 and the instrumentalities connected therewith.

When it is desired to disassemble the swing, the fastening bolts 29 are withdrawn from the braces 26, 26, and the fan and operating mechanism connected therewith are lifted from the swing body. The cables 25, 25 are disconnected from the anchors 32, 32, and the fan construction may be separately packed and removed.

Having thus described my invention, what I claim as new and desire to secure by Letters Patent is:

1. A lawn swing fan comprising a rotary fan having horizontally extended blades and a vertical shaft; a friction pulley fixedly mounted on said shaft; a plurality of rotary driving devices disposed on opposite sides of said pulley and adapted to operatively engage the same; a swinging frame; and a plurality of flexible transmission devices connecting the frame and the driving devices for alternately engaging with the said shaft the said driving devices on opposite sides thereof.

2. A lawn swing fan comprising a rotary fan having horizontally extended blades and a vertical shaft; a friction pulley fixedly mounted on said shaft; a plurality of friction driving disks loosely mounted to engage and release the said pulley; a swinging frame; and a plurality of flexible transmission devices connecting the frame and the driving devices for alternately engaging with the said shaft the said driving disks on opposite sides thereof.

3. A lawn swing fan comprising a rotary fan having horizontally extended blades and a vertical shaft; a friction pulley fixedly mounted on said shaft; a plurality of friction driving disks loosely mounted to engage and release the said shaft; a swinging frame; and a plurality of flexible transmission devices connecting the frame and the driving devices for alternately engaging with the said pulley the said friction disks on opposite sides thereof.

4. A lawn swing fan comprising a rotary fan having horizontally extended blades and a vertical shaft; a friction pulley fixedly mounted on said shaft; a plurality of friction driving disks loosely mounted to engage and release the said shaft; a swinging frame; a plurality of flexible transmission devices connecting the frame and the driving devices for alternately engaging with the said pulley the said friction disks on opposite sides thereof; and a rotary balance weight fixedly mounted on said shaft.

5. A lawn swing fan comprising a stationary standing structure; a swing pivotally mounted in said structure; a frame consisting of two narrow bars joined in separated relation to form bearings for a fan operating mechanism, one of said bars having vertical extensions provided to secure the said frame upon the said stationary structure; a shaft vertically mounted in bearings in the said bars; a plurality of rotary driving members loosely mounted in said bars to engage and release alternately and from opposite sides the said shaft; and a plurality of flexible transmission devices each fixedly anchored to the said swing and rotatively engaging the one of said rotary driving members on the side of the said shaft removed from the anchorage of said devices.

6. A lawn swing fan comprising a stationary standing structure; a swing pivotally mounted in said structure; a frame consisting of two narrow bars joined in separated relation to form bearings for a fan operating mechanism, one of said bars having vertical extensions provided to secure the said frame upon the said stationary structure; a shaft vertically mounted in bearings in the said bars; a plurality of rotary driving members loosely mounted in said bars to engage and release alternately and from opposite sides the said shaft; a plurality of flexible transmission devices each fixedly anchored to the said swing and rotatively engaging the one of said rotary driving members on the side of the said shaft removed from the anchorage of said device; and a weighted balance wheel mounted on said shaft to carry over lapses of driving engagement.

7. A lawn swing fan comprising a stationary standing structure; a swing pivotally mounted in said structure; a frame consisting of two narrow bars joined in separated relation to form bearings for a fan operating mechanism, one of said bars having vertical extensions provided to secure the said frame upon the said stationary structure; a shaft vertically mounted in bearings in the said bars; horizontally extended fan blades fixedly mounted on said shaft; a friction pulley fixedly mounted on said shaft between said bars; a plurality of friction driving disks loosely mounted on said frame between said bars to be moved into and out of driving contact with said pulley; a plurality of flexible transmission devices each fixedly anchored to the said swing and rotatively engaging the one of said driving disks on the side of the said shaft removed from the anchorage of said devices; and a weighted balance wheel mounted on said shaft to carry over lapses of driving engagement.

In testimony whereof I have signed my name to this specification in the presence of two subscribing witnesses.

JAMES ELY HALL.

Witnesses:
J. H. McHenry,
F. P. Seawell.